(12) United States Patent
Bauer et al.

(10) Patent No.: US 8,879,216 B2
(45) Date of Patent: Nov. 4, 2014

(54) CIRCUIT ARRANGEMENT FOR A CONTROL DEVICE

(75) Inventors: Ralph Bauer, Esslingen (DE); Klaus Dressler, Loechgau (DE)

(73) Assignee: Robert Bosch GmbH, Stuttgart (DE)

( * ) Notice: Subject to any disclaimer, the term of this patent is extended or adjusted under 35 U.S.C. 154(b) by 46 days.

(21) Appl. No.: 13/322,077

(22) PCT Filed: May 19, 2010

(86) PCT No.: PCT/EP2010/056850
§ 371 (c)(1),
(2), (4) Date: Feb. 1, 2012

(87) PCT Pub. No.: WO2010/136361
PCT Pub. Date: Dec. 2, 2010

(65) Prior Publication Data
US 2012/0120535 A1    May 17, 2012

(30) Foreign Application Priority Data

May 29, 2009   (DE) .......................... 10 2009 026 600
Sep. 16, 2009  (DE) .......................... 10 2009 029 514

(51) Int. Cl.
*H02H 3/20*       (2006.01)
*H02H 9/04*       (2006.01)

(52) U.S. Cl.
CPC ..................................... *H02H 9/049* (2013.01)
USPC ........................................... 361/18; 361/91.1

(58) Field of Classification Search
USPC .................................................. 361/18, 91.1
See application file for complete search history.

(56) References Cited

U.S. PATENT DOCUMENTS

| | | | |
|---|---|---|---|
| 6,046,896 A * | 4/2000 | Saeki et al. ...................... 361/86 |
| 6,160,386 A * | 12/2000 | Hemena et al. ............... 323/272 |
| 6,198,259 B1 | 3/2001 | Ueki et al. |
| 8,416,549 B2 * | 4/2013 | Migliavacca ................ 361/91.1 |
| 2007/0217238 A1 | 9/2007 | Kanayama |
| 2008/0266739 A1 | 10/2008 | Migliavacca |
| 2009/0066403 A1 | 3/2009 | Horsky et al. |

FOREIGN PATENT DOCUMENTS

GB    2062373    5/1981

OTHER PUBLICATIONS

PCT/EP2010/056850 International Search Report.

* cited by examiner

*Primary Examiner* — Danny Nguyen
(74) *Attorney, Agent, or Firm* — Michael Best & Friedrich LLP

(57) ABSTRACT

The invention relates to a circuit arrangement (10) for a control device, and a method for operating said circuit arrangement (10). The circuit arrangement (10) comprises a first field-effect transistor (12) actuating the control device, and a comparator, which compares the voltage provided for actuating the control device with a threshold voltage, and which actuates a timed operation of the first field-effect transistor (12) via a control unit (20) if the threshold voltage is exceeded.

12 Claims, 2 Drawing Sheets

CIRCUIT ARRANGEMENT FOR A CONTROL DEVICE

BACKGROUND OF THE INVENTION

The invention relates to a circuit arrangement for a control device and a method for actuating a control device.

Control devices, particularly for automotive applications, have to be protected against reverse polarity and electrical surge (for example: load dump). A so-called main relay, which is supposed to ensure an extremely small quiescent current consumption, is furthermore needed to operate these control devices.

The functions: reverse polarity protection, electrical surge protection and main relay are known from prior art as individual, separate circuits. As a result, the electrical surge protection is usually implemented only by means of a transient voltage suppression diode; and all of the successive circuit parts have to be able to withstand the terminal voltages of the transient voltage suppression diode.

SUMMARY OF THE INVENTION

The invention provides a circuit arrangement combining, at least in several embodiments, the individual functions: reverse polarity protection, electrical surge protection, plug contact protection and main relay. A type of "switching regulator" is achieved by the circuit arrangement, said regulator limiting the voltage by means of a timed operation if a switching threshold is exceeded.

DETAILED DESCRIPTION

Figure 1:
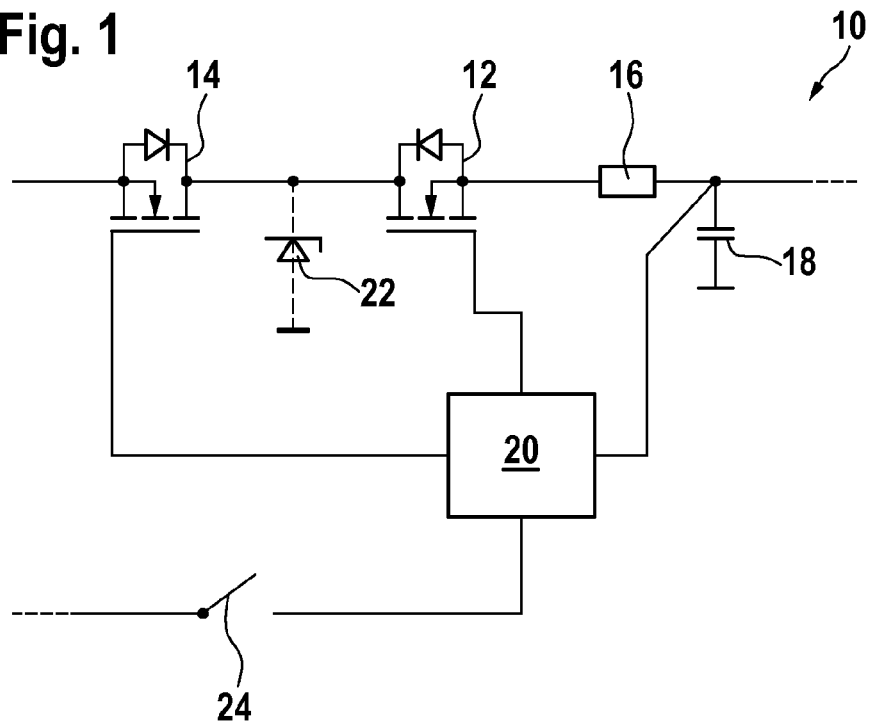
FIG. 1 shows an embodiment of the circuit arrangement described according to the invention.

A possible embodiment of the circuit arrangement presented, the totality thereof denoted by the reference numeral 10, is depicted in FIG. 1. A first field-effect transistor T1 12, a second field-effect transistor T2 14, an optional inductor L1 16, a capacitor C1 18, a control unit or control logic 20, an optional diode D1 22 and an ignition switch 24 can be recognized in said circuit arrangement.

If the ignition switch 24 is open, the transistor T1 12 is cut off and the quiescent current consumption of the downstream circuit is approximately 0 A. Via the body diode of T2 14, the supply voltage less the diode voltage of T2 14 is present at the drain terminal of T1 12. If the ignition switch 24 is now closed, first the transistor T1 12 and subsequently T2 14 are actuated via the control logic and thus with low impedance. If the voltage at C1 18 (protected voltage) exceeds a threshold, T1 12 is cut off by the control logic 20. If the voltage at C1 18 has again dropped below a second threshold C1 18, T1 12 becomes conductive again and the process within the circuit starts again from the beginning. In so doing, the voltage at C1 18 is limited. The capacitor C1 18 and the optional inductor L1 16 serve in this instance to store energy or to smooth the voltage at C1 18.

The voltage at the drain terminal of T1 12 can be limited to an intermediate voltage with the optional transient voltage suppression diode D1 22 in order to reduce the power loss in T1 12. In the event of a polarity reversal, a cut off is made via the control logic 20 T2 14 and the entire downstream circuit is consequently protected against reverse polarity.

Figure 2:
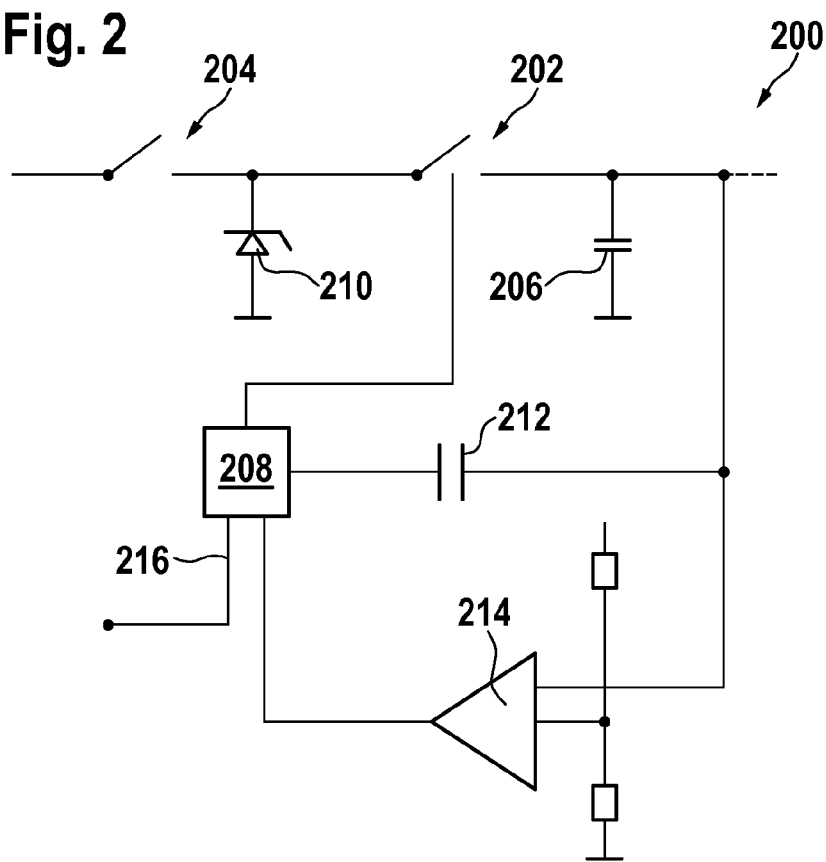
FIG. 2 shows a further embodiment of the circuit arrangement presented according to the invention.

The circuit arrangement 10 depicted in FIG. 1, respectively input circuitry, fulfills the following functions:
 internal, electronic main relay
 load dump protection
 reverse polarity protection
 plug contact protection when plugging into a live voltage source FIG. 2 shows a further embodiment of the circuit arrangement, which is denoted as a whole with the reference numeral 200. A first field-effect transistor 202 and a second field-effect transistor 204, which are depicted in a simplified manner as switches, are shown. Furthermore, a storage element 206, in this case a capacitor, a control unit 208, a Zener diode 210, a booster capacitor 212 and a comparator 214 are depicted.

The booster capacitor 212 provides energy for switching the first field-effect transistor 202 when turning on the circuit. The control unit 208 detects that the circuit has been turned on via a connection 216, the so-called terminal 15. In this way, said control unit detects whether an ignition key has been inserted. If this is not the case, the first field-effect transistor 202 inhibits current flow and said control unit is not supplied with voltage.

The storage element 206 smoothes the voltage supplied to the control unit. The comparator 214 checks the voltage which has been provided to the control unit and compares said voltage with a threshold voltage. If said voltage provided to the control unit exceeds said threshold voltage, the first field-effect transistor is operated via said control unit in a clocked fashion.

The second field-effect transistor 204 ensures the provision of reverse polarity protection. The first field-effect transistor 202 serves as a main relay and ensures the provision of surge protection and plug contact protection.

In order to satisfy the demands of customers for low quiescent current when the control unit is switched off, no current paths may exist, which in total exceed a quiescent current of, for example, 100:A.

As a result of the selected circuit arrangement 10, it is possible to connect the control unit to the wiring harness without a high contact current already arising upon making the connection, said contact current being due to the charging of the internal electrolytic capacitors. The circuit arrangement 30 is intended for use with standard MOSFETs.

Load Dump Protection

In order to protect against high voltage surges from the on-board power supply, a power Zener diode is disposed in the control unit downstream of the reverse polarity protection FET. The input voltage is, for example, limited to values <60 V by this diode.

When a load dump occurs, the diode has to absorb a high proportion of the energy arising from said load dump. The energy to be absorbed by the diode is dependent upon the customer specification or norm, with which the pulse is defined (amplitude, duration, internal resistance).

A voltage reduction (e.g. <50 V) is required for different circuit parts. If this reduction in voltage takes place entirely with a power Zener diode, said diode would possibly be overloaded. In order to achieve said reduction in voltage, the switch FET is intermittently switched on and off by a 2-point controller, which is contained in the control logic, and the output voltage of the switching module is controlled.

A traditional switching regulator operation is not possible in the case of the relatively low frequency and low inductance of the EMC choke used as a storage choke. That means that the current is discontinuous during a timed operation. During power-up of the switch MOSFET, the rate of current rise is limited by the supply cable inductance and the storage choke inductance. The maximum pulse current value is determined by the differential voltage between generator voltage and electrolytic capacitor voltage and by the ohmic resistors included in the circuit.

A satisfactory operation of the circuit is only possible if the internal resistance of the LD pulse is specified sufficiently high. Said resistance significantly determines the current amplitude.

Figure 3:
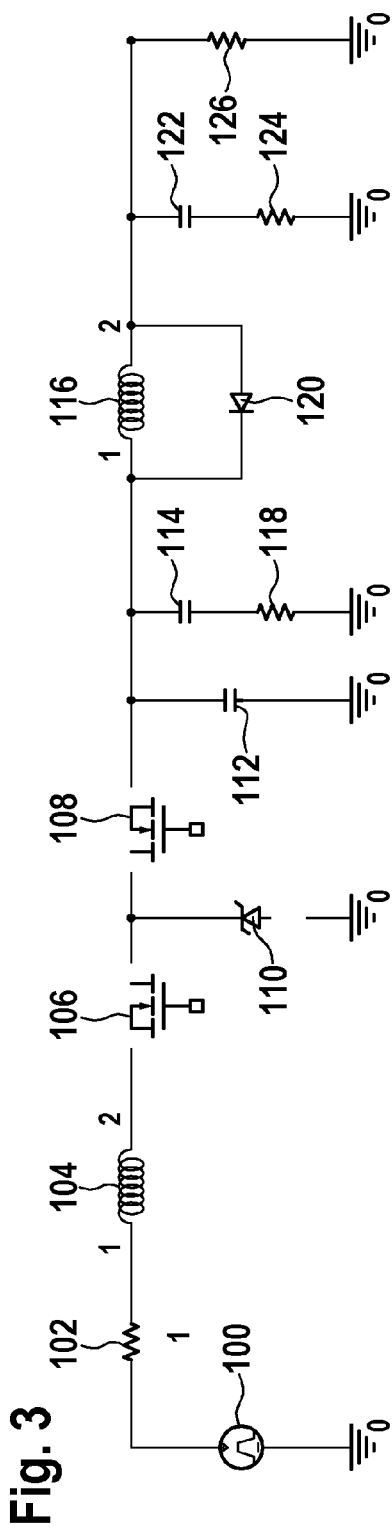
FIG. 3 shows a simplified model of the circuit arrangement.
Figure 4:
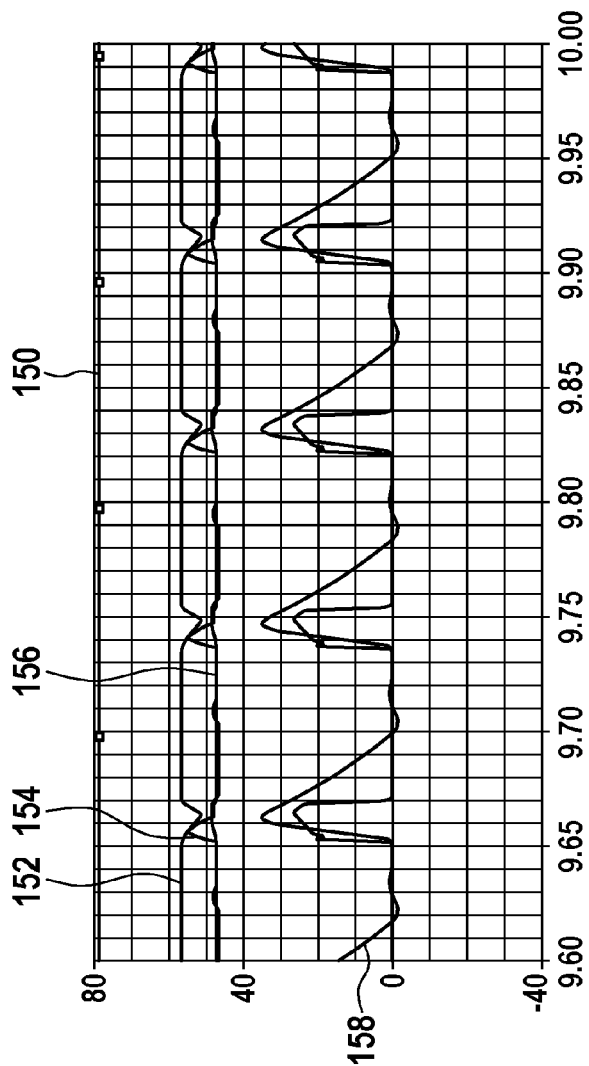
FIG. 4 shows typical current and voltage profiles.

FIG. 3 shows a simplified model of the circuit arrangement, in which the relevant circuit components are included for an overview of the LD (load dump) transient voltage control system. The depiction shows a LD (load dump) generator 100, a RI-LD generator 102, an inductor supply cable (L) 104, a reverse polarity protection FET 106, a switch FET 108, an LD (load dump) diode, a capacitor filter (C filter) 112, a further C filter 114, an EMC inductor (L) 116 (optional), an attenuator 118, a diode D8 120, a buffer electrolytic capacitor (C) 122, a resistor R22 124 and a load resistor 126.

The invention claimed is:

1. A circuit arrangement for a control device comprising a first field-effective transistor (12, 202), which actuates the control device, a comparator (214), which compares the voltage provided for actuating said control device with a threshold voltage and which actuates a timed operation of the first field-effect transistor (12, 202) via a control unit (20, 208) if the threshold voltage is exceeded.

2. The circuit arrangement according to claim 1, in which a diode (22), is connected directly upstream of the first field-effective transistor (12, 202).

3. The circuit arrangement according to claim 1, in which a storage element (206) is provided, the voltage provided to the control device being smoothed via the storage element.

4. The circuit arrangement according to claim 3, in which a capacitor (18) serves as the storage element (206).

5. The circuit arrangement according to claim 1, in which a second field-effective transistor (14, 204) is connected in series with the first field-effect transistor (12, 202) in an anti-serial (back-to-back) manner.

6. The circuit arrangement according to claim 1, further comprising a booster capacitor (212), which provides energy at a point in time when the circuit is turned on.

7. A method for actuating a control device, the method comprising: actuating the control device via a first field-effective transistor (12, 202), comparing a voltage provided to actuate said control device with a threshold value by a comparator (214) and actuating a timed operation of the first field-effective transistor (12, 202) via a control unit (20, 208) if the threshold voltage is exceeded.

8. The method according to claim 7, further comprising smoothing the voltage provided to the control device by a storage element (206).

9. The method according to claim 7, further comprising providing a second field-effective transistor (14, 204), which is connected in series with the first field-effective transistor (12, 202) in an anti-serial manner.

10. The method according to claim 7, further comprising providing energy by a booster capacitor (212) at the point in time when the circuit is turned on.

11. The circuit according to claim 2, wherein the diode (22) is a Zener diode (212).

12. The method according to claim 7, wherein the method is carried out by a circuit arrangement (10, 200) according to claim 1.

* * * * *